United States Patent [19]  [11] 4,410,661
Epstein et al.  [45] Oct. 18, 1983

[54] TOUGHENED POLYAMIDE BLENDS

[75] Inventors: Bennett N. Epstein, Wilmington, Del.; Rolando U. Pagilagan, Parkersburg, W. Va.

[73] Assignee: E. I. Du Pont de Nemours and Company, Wilmington, Del.

[21] Appl. No.: 427,414

[22] Filed: Sep. 29, 1982

Related U.S. Application Data

[63] Continuation of Ser. No. 295,018, Aug. 21, 1981, abandoned.

[51] Int. Cl.$^3$ ............................................. C08L 77/00
[52] U.S. Cl. .................................... 525/66; 525/182; 525/183; 525/184
[58] Field of Search ................. 525/66, 182, 183, 184

[56] References Cited

U.S. PATENT DOCUMENTS

| | | | |
|---|---|---|---|
| 3,673,277 | 6/1977 | Schmitt | 525/183 |
| 4,100,223 | 7/1978 | Meyer | 525/183 |
| 4,167,505 | 9/1979 | Dunkelberger | 525/183 |

FOREIGN PATENT DOCUMENTS

| | | | |
|---|---|---|---|
| 2471399 | 6/1981 | France | 525/66 |
| 54-155222 | 12/1979 | Japan | 525/184 |

*Primary Examiner*—John C. Bleutge
*Assistant Examiner*—Ana L. Carrillo

[57] ABSTRACT

Amorphous thermoplastic polyamide can be combined with semicrystalline thermoplastic polyamides and toughening agents to produce molding blends having good notched Izod values in molded form.

12 Claims, No Drawings

TOUGHENED POLYAMIDE BLENDS

This is a continuation of application Ser. No. 295,018, filed Aug. 21, 1981, now abandoned.

FIELD OF THE INVENTION

This invention relates to toughened polyamide blends, and more particularly to toughened blends of at least one amorphous polyamide and at least one semicrystalline polyamide.

BACKGROUND OF THE INVENTION

The properties of thermoplastic polyamide molding resins may be altered by addition of various additives to the resins, such as fillers or reinforcing agents, flame retardants, stabilizers and the like. In addition, other thermoplastic polymers, such as ionomeric resins, polymeric toughening agents and the like, may be added to the semicrystalline polyamide molding resins to enhance certain properties. Furthermore, certain amorphous polyamides can be molded to produce transparent molded articles. As with the semicrystalline polyamides, certain additives including other thermoplastic polymers can be added to the amorphous polymers to enhance certain properties.

SUMMARY OF THE INVENTION

In this invention, it has been discovered that blends of amorphous thermoplastic polyamides and semicrystalline thermoplastic polyamides can be toughened with toughening agents to a degree greater than that expected from toughening either polyamide alone.

In its broadest aspect, this invention is a blend containing (I) 99–60% by weight of thermoplastic polyamides comprising complementally (a) about 20 to 90 percent by weight, based on total polyamide, of a thermoplastic semicrystalline polyamide of film-forming molecular weight, (b) about 80 to 10 percent by weight, based on total polyamide, of a thermoplastic amorphous polyamide obtained from at least one aromatic dicarboxylic acid containing 8–18 carbon atoms and at least one diamine selected from the class consisting of (i) 2–12 carbon normal aliphatic straight-chained diamine (ii) 4–18 carbon branched aliphatic diamine, and (iii) 8–20 carbon cycloaliphatic diamine containing at least one cycloaliphatic, preferably cyclohexyl, moiety, and wherein optionally, up to 50 weight percent of the amorphous polyamide may consist of units obtained from lactams or ω-aminoacids containing 4–12 carbon atoms, or from polymerization salts of aliphatic dicarboxylic acids containing 4–12 carbon atoms and aliphatic diamines containing 2–12 carbon atoms, with complementally (II) 1–40% by weight of blend of a toughening agent having a maximum tensile modulus of 80,000 psi, that is an organic polymer of film-forming molecular weight which imparts to component (a) a notched Izod value at least 50 percent greater than the notched Izod value of Component (a) alone when 20% by weight of the toughening agent is present with Component (a).

The term "thermoplastic semicrystalline polyamide" means that the polyamide has a distinct melting point with a measurable heat of fusion as described below. Amorphous polyamides will generally have no distinct melting point nor measurable heat of fusion although with very slow cooling from the melt or sufficient annealing some crystallinity may develop. The heat of fusion is conveniently determined by use of a differential scanning calorimeter (DSC). A suitable calorimeter is The Du Pont Company's 990 thermal analyzer, Part Number 990000 with cell base II, Part Number 990315, and DSC cell, Part Number 900600. With this instrument, heat of fusion can be measured at a heating rate of 20° C. per minute. The sample is alternately heated to a temperature above the anticipated melting point and cooled rapidly by cooling the sample jacket with liquid nitrogen. The heat of fusion is determined on any heating cycle after the first and should be a constant value, within experimental error. Amorphous polyamides are defined herein as having a heat of fusion, by this method, of less than 1 cal/gram. Semicrystalline polyamides are defined herein as having a heat of fusion of more than 1 cal/gm. For reference, semicrystalline 66 nylon polyamide with a molecular weight of about 17,000 has a heat of fusion of about 16 cal/gm.

DESCRIPTION OF THE INVENTION

The semicrystalline polyamides are well-known in the art. They have a molecular weight over 10,000 and can be produced by condensation of equimolar amounts of a saturated aliphatic dicarboxylic acid containing from 4–12 carbon atoms with an aliphatic diamine containing 2–12 carbon atoms, in which the diamine can be employed, if desired, to provide an excess of amine end groups over carboxy end groups in the polyamide. Vice versa, the diacid can be used to provide an excess of acid groups. Equally well, these polyamides may be made from acid-forming and amine-forming derivatives of said acids and amines such as esters, acid chlorides, amine salts, etc. Representative aliphatic dicarboxylic acids used to make the polyamides include adipic acid, pimelic acid, azelaic acid, suberic acid, sebacic acid, and dodecanedioic acid, while representative aliphatic diamines include hexamethylene diamine and octamethylenediamine. In addition, these polyamides can also be prepared from self-condensation of a lactam. Examples of polamides include polyhexamethylene adipamide (66 nylon), polyhexamethylene azelamide (69 nylon), polyhexamethylene sebacamide (610 nylon), and polyhexamethylene dodecanoamide (612 nylon), polybis(p-aminocyclohexyl)methane dodecanoamide, or polyamides produced by ring opening of lactams; i.e., polycaprolactam (6 nylon) and polylauryl lactam. It is also possible to use polyamides prepared by the polymerization of at least two of the amines or acids used to prepare the above polymers, as for example, a polymer made of adipic acid, and sebacic acid and hexamethylene diamine. Blends of polyamides, such as a mixture of 66 nylon and 6 nylon are also included as are copolymers such as nylon 66/6. Preferably the condensation polyamide employed herein is polyhexamethylene adipamide (66 nylon), or a blend of polyhexamethylene adipamide (66 nylon) and polycaprolactam (6 nylon).

With respect to the amorphous polyamides, by the term aromatic dicarboxylic acid is meant that the carboxyl groups are attached directly to an aromatic ring, such as phenylene, naphthalene, etc. By the term aliphatic diamine is meant that the amine groups are attached to a nonaromatic-containing chain such as alkylene. By cycloaliphatic diamine is meant that the amine groups are attached to a cycloaliphatic ring composed of 3 to 15 carbon atoms. The 6 carbon cycloaliphatic ring is preferred.

Preferred examples of amorphous polyamides include (a) polyamides obtained from hexamethylene diamine and a mixture of 55–100 weight percent isophthalic acid and 45%–0 terephthalic acid (based on total weight of the acids), (b) polyamides obtained from (i) a mixture of 70–100 weight percent 2,2,4- and/or 2,4,4-trimethylhexamethylene diamine and 30 to 0 weight percent hexamethylene diamine and (ii) 0–100 weight percent terephthalic acid and 100–0% isophthalic cid, wherein total weight percent diamine refers to total diamines present and weight percent acid refers to total acids present, (c) polyamides obtained from (i) an 8–20 carbon atom cycloaliphatic diamine with at least one cyclohexyl moiety and (ii) a mixture of 50–100 weight percent isophthalic acid and 50–0 weight percent terephthalic acid; and 10–50 weight percent (based on the total weight of polyamide) of a lactam, ω-aminoacids containing 4–12 carbon atoms, or salts of aliphatic dicarboxylic acids containing 4–12 carbon atoms and aliphatic diamines containing 2–12 carbon atoms, (d) polyamides obtained from a mixture of:
 (i) 40–98 mole percent isophthalic acid, based on total acids present,
 (ii) 2–60 mole percent terephthalic acid based on total acids present,
 (iii) 50–98 mole percent hexamethylene diamine, based on total amines present; and
 (iv) 2–50 mole percent, based on total amines present, of at least one aliphatic diamine containing between 8 and 20 carbon atoms and containing at least one cyclohexane nucleus, wherein the mole percent acids present totals 100% and the mole percent amines present totals 100%.

The amorphous polyamides exhibit melt viscosities at 300° C. of less than 50,000 poise, preferably less than 20,000 poise measured at a shear stress of $10^5$ dynes/cm$^2$. The amorphous polyamides can be prepared by known polymer condensation methods in the composition ratios mentioned above. In order to form high polymers the total moles of the acids employed should equal the total moles of the diamines employed.

Representative preferred cycloaliphatic diamines containing 8–20 carbon atoms and at least one cyclohexyl moiety or nucleus include 1-amino-3-aminomethyl-3,5,5-trimethylcyclohexane, i.e.,

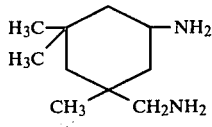

1,3- or 1,4-bis(aminomethyl)cyclohexane, i.e.,

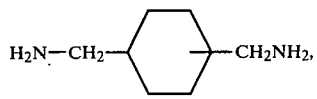

bis(p-aminocyclohexyl)methane, i.e.,

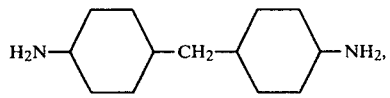

and the like.

As normally made the 1-aminomethyl-3,5,5-trimethylcyclohexane and the 1,3- or 1,4-bis(aminomethyl)-cyclohexane are mixtures of the cis and trans isomers. Any isomer ratio may be used in this invention.

Bis(p-aminocyclohexyl)methane (PACM hereinafter) which can be used as one of the diamine components in this invention is usually a mixture of three stereoisomers. In this invention any ratio of the three may be used.

In addition to isophthalic acid and terephthalic acid, derivatives thereof, such as the chlorides, may be used to prepare the polymer.

The polymerization to prepare the amorphous polyamides may be performed in accordance with known polymerization techniques, such as melt polymerization, solution polymerization and interfacial polymerization techniques, but it is preferred to conduct the polymerization in accordance with the melt polymerization procedure. This procedure produces polyamides having high molecular weights. In the polymerization, diamines and acids are mixed in such amounts that the ratio of the diamine components and the dicarboxylic acid components will be substantially equimolar. In melt polymerization the components are heated at temperatures higher than the melting point of the resulting polyamide but lower than the degradation temperature thereof. The heating temperature is in the range of about 170° to 300° C. The pressure can be in the range of vacuum to 300 psig. The method of addition of starting monomers is not critical. For example, salts of combinations of the diamines and acids can be made and mixed. It is also possible to disperse a mixture of the diamines in water, add a prescribed amount of a mixture of acids to the dispersion at an elevated temperature to form a solution of a mixture of nylon salts, and subject the solution to the polymerization.

If desired, a monovalent amine or, preferably, an organic acid, may be added as viscosity adjuster to a mixture of starting salts or an aqueous solution thereof.

The amounts of the amorphous polyamide present in the toughened blend of this invention will be between 10–80%, preferably 15–50% by weight based on total polyamide present.

The toughening agent can be any toughening agent useful for imparting greater toughness to semicrystalline polyamide resins.

Representative toughening agents include those described in U.S. Pat. No. 4,174,358 from column 3, line 30 to column 7, line 26; those described in U.S. Pat. No. 3,668,274 from column 1, lines 34–75 and column 3, line 38 to column 6, line 54; and those described in U.S. Pat. No. 3,845,163 from column 2, lines 1–47 and the corresponding unneutralized copolymers.

The toughening agents of U.S. Pat. No. 4,174,358 can be described as follows. Branched and straight chain polymers represented by the formula:

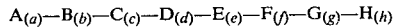

derived in any order, e.g., random, from monomers A to H where

A is ethylene;

B is CO;

C is an unsaturated monomer taken from the class consisting of, -ethylenically unsaturated carboxylic acids having from 3 to 8 carbon atoms, and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions and dicarboxylic acids and monoesters of the dicarboxylic acid neutralized by amine-ended caprolactam oligomers having a DP of 6 to 24;

D is an unsaturated epoxide of 4 to 11 carbon atoms;

E is the residue derived by the loss of nitrogen from an aromatic sulfonyl azide substituted by carboxylic acids taken from the class consisting of monocarboxylic and dicarboxylic acids having from 7 to 12 carbon atoms and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by netrualization with metal ions;

F is an unsaturated monomer taken from the class consisting of acrylate esters having from 4 to 22 carbon atoms, vinyl esters of acids having from 1 to 20 carbon atoms (substantially no residual acid), vinyl ethers of 3 to 20 carbon atoms, and vinyl and vinylidene halides, and nitriles having from 3 to 6 carbon atoms;

G is an unsaturated monomer having pendant hydrocarbon chains of 1 to 12 carbon atoms capable of being grafted with monomers having at least one reactive group of the type defined in C, D and E, and pendant aromatic groups which may have 1 to 6 substituent groups having a total of 14 carbon atoms; and H is an unsaturated monomer taken from the class consisting of branched, straight chain and cyclic compounds having from 4 to 14 carbon atoms and at least one additional nonconjugated unsaturated carbon-carbon bond capable of being grafted with a monomer having at least one reactive group of the type defined in C, D and E.

The aforementioned monomers may be present in the polymer in the following mole fraction:

(a) 0 to 0.95;
(b) 0 to 0.3;
(c) 0 to 0.5;
(d) 0 to 0.5;
(e) 0 to 0.5;
(f) 0 to 0.99;
(g) 0 to 0.99; and
(h) 0 to 0.99 so that the total of all components is a mole fraction of 1.0.

At least one of B, C, D and E is present in all polymeric systems. When A is present, in addition to at least one of B, C, D and E being present, at least one of F, G and H is also present. A mixture of two or more polymers can be used with the proviso that at least one of B, C, D and E is present in at least one of the polymers.

Illustrative of monomers C to H of the above formula are:

C is maleic acid, maleic anhydride, maleic acid monoethyl ester, metal salts of acid monoethyl ester, fumaric acid, fumaric acid monoethyl ester, itaconic acid, vinyl benzoic acid, vinyl phthalic acid, metal salts of fumaric acid monoethyl ester, monoesters of maleic, fumaric, itaconic acids with R where R is up to 29 carbon atoms, e.g., methyl, propyl, isopropyl, butyl, isobutyl, hexyl, cyclohexyl, octyl, 2-ethyl hexyl, decyl, stearyl, methoxy ethyl, ethoxy ethyl, hydroxy ethyl, etc.

D is glycidyl methacrylate, glycidyl acrylate, allyl glycidyl ether, vinyl glycidyl ether, glycidyl itaconate, etc.

E is phthalic anhydride sulfonyl azide, methyl ester and monooctadecyl ester of phthalic anhydride sulfonyl azide, benzoic acid sulfonyl azide, naphthoic acid sulfonyl azide, naphthoic diacid sulfonyl azide, R-monoesters (and metal salts thereof) of phthalic acid and naphthoic diacid sulfonyl azide, where R is up to 29 carbon atoms, etc;

F is methyl methacrylate, butyl acrylate, ethyl acrylate, vinyl acetate, methyl vinyl ether, zinc methacrylate, acrylonitrile, R-esters of acrylic, methacrylic acids; R-vinyl ethers, vinyl benzoate, vinyl naphthoate, vinyl esters of R-acids, where R is up to 18 carbon atoms, vinyl chloride, vinylidene fluoride, etc.;

G is styrene, propylene, isobutylene, vinyl naphthalene, vinyl pyridine, vinyl pyrrolidone, mono-, di-, trichlorostyrene, R'-styrene where R' is 1 to 10 carbon atoms, butene, hexene, octene, decene, etc.; and H is hexadiene, norbornadiene, butadiene, isoprene, divinyl allyl styrene, etc.

The toughening agents of U.S. Pat. No. 3,668,274 can be described as follows:

An organic polymer which comprises a first phase polymerized from monomers comprising 50 to 99.9 parts by weight alkyl acrylate wherein the alkyl group contains one to 15 carbon atoms, butadiene or substituted butadiene; 0 to 40 parts by weight of other ethylenically unsaturated monomers; 0 to 5 parts by weight of a polyethylenically unsaturated crosslinking monomer; and 0 to 5 parts by weight of a graft-linking monomer; and a final rigid phase thermoplastic stage containing amine-reactive carboxylic acid groups and polymerized from monomers comprising 1 to 50 parts by weight of a copolymerizable carboxylic acid, 50 to 99 parts by weight of a member selected from the group consisting of alkyl methacrylates, styrenes, acrylonitrile, methacrylonitrile and olefins that when homopolymerized, form polymers having a heat distortion temperature greater than about 20° C.; 0 to 49 parts by weight of another acrylic monomer; and 0 to 40 parts of another copolymerizable ethylenically unsaturated monomer.

The toughening agents of U.S. Pat. No. 3,845,163 can be described as normally solid ionic copolymer of units derived from α-olefin having the formula $RCH=CH_2$ wherein R is H or alkyl having from 1 to 8 carbon atoms and from 0.2 to 25 mole percent of units derived from an $\alpha,\beta$-ethylenically unsaturated mono- or dicarboxylic acid, at least 10% of the acid groups of said units being neutralized by metal ions having a valence of from 1 to 3, inclusive. The toughening agent can also be the unneutralized polymers used to make the toughening agents of U.S. Pat. No. 3,845,163, and in addition can be copolymers of the α-olefin and derivatives of the unsaturated mono- or dicarboxylic acid, such as the monoesters of alcohols of 1-29 carbon atoms, the anhydrides of the dicarboxylic acids, and the like.

Examples of toughening agents include (1) a polymer of ethylene, at least one α-olefin of 3 to 6 carbon atoms, and at least one unsaturated monomer taken from the class consisting of branched, straight chain and cyclic compounds having from 4 to 14 carbon atoms and having at least one additional nonconjugated unsaturated carbon-carbon bond, in which said polymer has grafted thereto an unsaturated monomer taken from the class consisting of (a) α,β-ethylenically unsaturated dicarboxylic acids having from 3 to 8 carbon atoms, and derivatives thereof taken from the class consisting of monoesters of alcohols of 1 to 29 carbon atoms, (b) anhydrides of the dicarboxylic acids, and (c) the metal salts of the dicarboxylic acids and the monoesters of said dicarboxylic acid having from 0 to 100 percent of the carboxylic groups ionized by neutralization with metal ions. More specifically, the polymer can be a copolymer of ethylene, propylene and 1,4-hexadiene and, optionally, norbornadiene, said copolymer having grafted thereto an unsaturated monomer taken from the class consisting of fumaric acid, maleic acid, maleic anhydride, the monoalkyl ester of said acids in which the alkyl group of the ester has 1 to 3 carbon atoms;

(2) a copolymer of ethylene, methyl or ethyl acrylate, and from about 0.0025-0.077 mole/100 g polymer of a mono alkyl ester of 1,4-butenedioic acid in which the alkyl group of the ester has 1 to 6 carbon atoms and having 0 to 100 percent of the esters of 1,4-butenedioic acid ionized by neutralization with metal ions selected from lithium, sodium, potassium, calcium and zinc ions;

(3) a polymer of ethylene and unsaturated monomers taken from the class consisting of (a) α,β-ethylenically unsaturated carboxylic acids (preferably) having from 3 to 8 carbon atoms, and derivatives of the acid taken from the class consisting of (a) monoesters of alcohols of 1 to 29 carbon atoms, (b) dicarboxylic acids and anhydrides of the dicarboxylic acids and (c) metal salts of the monocarboxylic, dicarboxylic acids and monoesters of the dicarboxylic acid having from 0 to 100 percent of the carboxylic acid groups ionized by neutralization with metal ions.

Useful specific polymers for toughening include the following polymers: ethylene/methacrylic acid or zinc salt of methacrylic acid, zinc salt of ethylene/isobutyl acrylate/methacrylic acid; ethylene/methyl acrylate/-monoethyl ester of maleic anhydride and 0 to 100 percent neutralized zinc, sodium, calcium, lithium, antimony, and potassium salts thereof; mixture of ethylene/isobutyl acrylate/methacrylic acid and ethylene/methyl acrylate/monoethyl ester of maleic anhydride and zinc salts thereof; ethylene/methyl acrylate/methacrylic acid and zinc salts thereof; ethylene/vinyl acetate/methacrylate acid and zinc salts thereof; ethylene/methyl methacrylate/methacrylic acid and zinc salts thereof; ethylene/vinyl acetate/carbon monoxide; mixtures of ethylene/vinyl acetate/carbon monoxide and a zinc salt of ethylene/isobutyl acrylate/methacrylic acid; mixtures of ethylene/vinyl acetate and a zinc salt of ethylene/isobutyl acrylate/methacrylic acid; mixtures of ethylene/isobutyl acrylate and a zinc salt of ethylene/isobutyl acrylate/methacrylic acid; mixtures of ethylene/acrylic acid and ethylene/vinyl acetate; ethylene/isobutyl acrylate/carbon monoxide; ethylene/stearyl methacrylate/carbon monoxide; ethylene/n-butyl acrylate/carbon monoxide; ethylene/2-ethyl hexyl methacrylate/carbon monoxide; ethylene/vinyl acetate/maleic anhydride; ethylene/vinyl acetate/monoethyl ester of maleic anhydride; ethylene/vinyl acetate/glycidyl methacrylate; ethylene/propylene/1,4-hexadiene-g-maleic anhydride; mixtures of ethylene/propylene/1,4-hexadiene and ethylene/maleic anhydride; mixtures of ethylene/-propylene/1,4-hexadiene and ethylene/propylene/1,4-hexadiene-g-maleic anhydride; ethylene/-propylene/1,4-hexadiene-g-fumaric acid; ethylene/-propylene/1,4-hexadiene/norbornadiene-g-maleic anhydride; ethylene/propylene/1,4-hexadiene/norbornadiene-g-monoethylester of maleic anhydride; ethylene/propylene/1,4-hexadiene/norbornadiene-g-fumaric acid; ethylene/propylene/1,4-hexadiene/glycidyl methacrylate; ethylene/propylene/1,4 hexadiene/-norbornadiene-, g-phthalic anhydride sulfonyl azide, mixtures of ethylene/propylene/1,4-hexadiene and ethylene/monoethyl ester of maleic anhydride; mixtures of ethylene/propylene/1,4-hexadiene and ethylene/butyl hydrogen maleate; mixtures of ethylene/propylene/1,4-hexadiene and ethylene/maleic anhydride, mixtures of butadiene/acrylonitrile and styrene/maleic anhydride; mixtures of ethylene/-propylene/1,4-hexadiene/norbornadiene and styrene/-maleic anhydride; isoprene/phthalic anhydride; butyl acrylate/monoethyl ester of fumaric acid; ethyl acrylate/fumaric acid; mixtures of ethylene/propylene and ethylene/monoethyl ester of maleic anhydride; ethylene/propylene/5-ethylidene-2-norbornene-g-fumaric acid, ethylene/propylene/dicyclopentadiene-g-monoethyl ester of maleic acid, ethylene/propylene/5-propenyl-2-norbornene-g-maleic anhydride, ethylene/-propylene/tetrahydroindene-g-fumaric acid, ethylene/-propylene/1,4-hexadiene/5-ethylidene-2-norbornene-g-fumaric acid, and mixtures of polyethylene and ethylene/propylene/hexadiene-g-fumaric acid copolymer.

The toughened blends of this invention can be prepared by mixing the crystalline polyamide, the amorphous polyamide and the toughening agent and then intimately melt blending them through a suitable melt extruder, or any other equipment for melt blending. The polyamides may be toughened separately and then dry blended or they may be toughened together. During blending the toughener is dispersed in the polyamides to a particle size that frequently is less than one micron. During mixing some transamidation may occur, the extent of which depends on factors such as temperature, residence time, and presence of substances that can catalyze the reaction.

The toughened blends may contain conventional fillers or reinforcing agents, such as glass, mica or the like, dyes, UV or heat stabilizers, flame-retardants, antioxidants, or plasticizers.

The toughened blends can be molded and extruded into useful articles having good solvent resistance, good dimensional stability, and toughness. These qualities make the blends useful for producing shaped bodies, such as automobile fenders, bumpers and the like, and long shapes, films, rods and tubes.

PREPARATION OF COPOLYAMIDE

Preparation of Tetrapolymer of 6I/6T/PACM I/PACM T (66.8/28.6/3.2/1.4 Weight Percent Salt Ratio)

6I refers to hexamethylene diamine (HMD) and isophthalic acid (I) units,
6T refers to HMD and terephthalic acid (T) units.
PACM I refers to units of PACM and I, and
PACM T refers to units of PACM and T.
PACM means bis(p-aminocyclohexyl)methane To 9958 lb. of water were added 2185 lb. aqueous HMD with a concentration of 80% HMD and 115 lb. of PACM containing about 59-60% cis, trans isomer. The mixture was heated to 60° C. and 1815 lb. of isophthalic and 778 lb. of terephthalic acids were added. The pH of the salt solution was then adjusted to 8.6±0.1 with HMD. After pH adjustment, 4.68 lb. of sodium phenylphosphinate was added.

6000 lb. of the salt solution (1800 lb. of salt) was charged into the preevaporator where the solution was concentrated to about 80% at 20 psig pressure and temperatures of 120°–140° C. The concentrated solution was then transferred to the autoclave and 7.2 lb. of glacial acetic acid and polyethylene oxide were added. The salt solution was then heated and the pressure allowed to rise to 250 psig and additional water was slowly bled off while maintaining the pressure. When the batch temperature reached about 280° C. the pressure was slowly reduced to atmospheric within 90 minutes followed by about 45-minute hold at atmospheric pressure. The polymer was then extruded from the autoclave by means of nitrogen pressure, quenched, and cut into pellets. Its inherent viscosity was 0.73. The polymer was surface coated with 0.09 weight percent aluminum distearate lubricant.

EXAMPLES

Test Procedures

Tensile strength and elongation were determined as described in ASTM D-638. The samples were tested dry-as-molded (DAM) and after conditioning to 50% relative humidity (RH) equilibrium moisture by boiling in potassium acetate solution (1.25 lb potassium acetate per lb water).

Flexural modulus was determined as described in ASTM D-790.

Notched Izod was determined as described in D-256.

The following examples illustrate the invention wherein the percentages are by weight unless indicated.

The toughened polyamide compositions are prepared as follows:

The polyamides and toughener in dry form were mixed after weighing in the proper proportions by tumbling in a polyethylene bag. The mixture was then blended in a 28 mm Werner Pfleiderer twin screw extruder in which the hopper was blanketed with nitrogen and the vacuum port maintained at about 25 to 30 inches vacuum. Extruder barrel temperatures were set at about the melting point of the polyamide matrix (±10° C., level condition) yielding melt temperatures in the range of 5° to about 100° C. above the melting point of the matrix.

The beading exiting the extruder was water quenched, cut and vacuum dried overnight at 80° C. prior to molding. Tensile bars ⅛ inch thick and test bars, ½×5×⅛ inch were molded in a 6 oz. injection molding machine at melt temperatures 10° to 30° C. above the melting point of the polyamide matrix. The mold temperature was about 90° C. with fast injection and a 20/20 or 20/30 molding cycle (seconds ram forward/second hold). The molded bars were tested in the dry-as-molded state and at 50 percent RH. The number of bars tested was sometimes less than that specified by ASTM.

Controls A to E were prepared by extrusion blending 66 polyamide and amorphous polymer in absence of toughener in the proportions indicated in Table 1.

The semicrystalline 66 polyamide had an inherent viscosity of about 1.25±0.10 measured as 0.5 g per 100 ml of m-cresol at 25° C. End groups were 65-73 eq. of $COOH/10^6$ gm of polymer and 47-53 eq. of $NH_2$ per $10^6$ gm of polymer. It had a heat of fusion of about 16 cal/gm.

The toughening agents used in the Examples had tensile moduli less than 80,000.

TABLE 1

| Control | 66 Polyamide % | Amorphous Polyamide % | Flexural Modulus Kpsi | Notched Izod Ft Lb/In |
|---|---|---|---|---|
| Control A | 100 | 0 | 420 | 1.1 |
| Control B | 75 | 25 | 450 | .5 |
| Control C | 50 | 50 | 410 | .6 |
| Control D | 25 | 75 | 430 | 1.2 |
| Control E | 0 | 100 | 390 | 1.0 |

It is seen that blends of the crystalline polyamide (66 polyamide) and amorphous polyamide without toughener do not show any consistent tendency toward toughening, as characterized by notched Izod measurement, when compared with the separate polymers.

Controls F and G and Example 1, in Table 2 below, were prepared using the same polyamides as in Controls A to E. The toughening agent for Control F and Example 1 comprised a mixture of (a) 10 percent of a copolymer of ethylene/propylene/hexadiene/norbornadiene, 66-70/25-29/4.1/0.4 on a weight basis and a Mooney viscosity of 50-60 by ASTM D-1646 ML-2+10 at 121° C. grafted with fumaric acid to obtain 1.8 percent fumaric acid graft, and (b) 9 percent of the copolymer defined in (a) but without carboxyl groups grafted thereto. The toughening agent for Control G contained 10 percent of (a) as in Control F and Example 1 and 9 percent of a copolymer of ethylene/propylene/hexadiene 70-74/23-27/2.4 with a Mooney viscosity of 42-54. The minor difference in Component (b) is not significant.

TABLE 2

| Example | 66 Polyamide % | Amorphous Polyamide % | Notched Izod Ft Lbs/In |
|---|---|---|---|
| Control F | 81 | 0 | 16.9*/20.7** |
| 1 | 54 | 27 | 22.5*/24.4** |
| Control G | 0 | 81 | 20.5*/21.6** |

*Measured at the end of the injection molded bar near the gate.
**Measured at the end of the injection molded bar away from the gate.

The notched Izod of the toughened blend of the two polyamides is, surprisingly, significantly higher than that of either toughened polyamide shown.

Example 2 and Control H, shown in Table 3 below, were prepared in the same way as Example 1 and Controls F and G except that 12 percent of the grafted ethylene copolymer was used as the toughening agent.

Again, the product with the blend of polyamides produced the tougher product.

TABLE 3

| | COMPOSITION | | DRY-AS-MOLDED PROPERTIES | | | | |
|---|---|---|---|---|---|---|---|
| EXAMPLE | 66 POLYAMIDE % | AMORPHOUS POLYAMIDE % | TENSILE STRENGTH Kpsi | ELONGATION % | FLEXURAL MODULUS Kpsi | NOTCHED IZOD Ft-Lb/In | FLEXURAL MODULUS 50% RH |
| 2 | 59 | 29 | 9.8 | 37.2 | 290 | 16.7/19.2 | 280 |
| Control H | 88 | — | 9.7 | 42.8 | 290 | 12.5/17.4 | 120 |

Example 3 and Controls I and F were prepared using the same polyamides as in the previous Examples, but the toughener used was 35% of an ionomeric copolymer. The ionomeric copolymer was an ethylene/methacrylic acid copolymer of weight ratio 90/10 that is 72% neutralized with $Zn^{++}$ ions. The copolymer was prepared as described in Rees U.S. Pat. No. 3,264,272 and had a melt flow (gms/10 min, measured by ASTM 1238, Condition E) of about 1 after neutralization.

Again, the blend of polyamides was toughened to a greater degree than either polyamide alone, as seen by Table 4.

TABLE 4

| | COMPOSITION | | | DRY-AS-MOLDED PROPERTIES | |
|---|---|---|---|---|---|
| EXAMPLE | CRYSTALLINE POLYAMIDE % | AMORPHOUS POLYAMIDE % | IONOMERIC COPOLYMER (TOUGHENER) % | FLEXURAL MODULUS Kpsi | NOTCHED IZOD Ft-Lb/In |
| Control I | 65% | — | 35% | 230 | 22.2/28.3 |
| Control J | — | 65% | 35% | 230 | 21.5/22.6 |
| Example 3 | 43.3% | 21.7% | 35% | 210 | 29.4/30.1 |

We claim:
1. A blend containing (I) 99–60% by weight thermoplastic polyamides comprising complementally
   (a) about 20 to 90 percent by weight, based on total polyamide, of at least one thermoplastic semicrystalline polyamide of film-forming molecular weight,
   (b) about 80 to 10 percent by weight, based on total polyamide, of at least one thermoplastic amorphous polyamide obtained from at least one aromatic dicarboxylic acid containing 8–18 carbon atoms and at least one diamine selected from the class consisting of
      (i) 2–12 carbon normal aliphatic straight-chained diamine
      (ii) 4–18 carbon branched aliphatic diamine, and
      (iii) 8–20 carbon cycloaliphatic diamine containing at least one cyclohexane moiety,
   and wherein optionally, up to 50 weight percent of the amorphous polyamide may consist of units obtained from lactams or ω-aminoacids containing 4–12 carbon atoms, or from polymerization salts of aliphatic dicarboxylic acids containing 4–12 carbon atoms and aliphatic diamines containing 2–12 carbon atoms,
with complementally (II) 1–40% by weight of blend of at least one toughening agent having a maximum tensile modulus of 80,000 psi, that is an organic polymer of film-forming molecular weight which imparts to Component (a) a notched Izod value at least 50% greater than the notched Izod value of Component (a) alone when 20% by weight of the toughening agent is present with Component (a).

2. A blend of claim 1 wherein in the polyamides defined in I, the semicrystalline polyamide, is present in an amount of between about 50–85 percent by weight based on weight of polyamides and the amorphous polyamide is present in an amount of between about 50–15 percent by weight based on weight of polyamides present.

3. The blend of claim 2 in which the amorphous polyamide is selected from
   (a) polyamides obtained from hexamethylene diamine and a mixture of 55–100 weight percent isophthalic acid and 45%–0 terephthalic acid (based on total weight of the acids),
   (b) polyamides obtained from (i) a mixture of 70–100 weight percent 2,2,4- and/or 2,4,4-trimethylhexamethylene diamine and 30 to 0 weight percent hexamethylene diamine and (ii) 0–100 weight percent terephthalic acid and 100–0% isophthalic acid, wherein total weight percent diamine refers to total diamines present and weight percent acid refers to total acids present,
   (c) polyamides obtained from (i) an 8–20 carbon atom cycloaliphatic diamine with at least one cyclohexyl moiety and (ii) a mixture of 50–100 weight percent isophthalic acid and 50–0 weight percent terephthalic acid; and 10–50 weight percent (based on the total weight of polyamide) of a lactam, ω-aminoacids containing 4–12 carbon atoms, or salts of aliphatic dicarboxylic acids containing 4–12 carbon atoms and aliphatic diamines containing 2–12 carbon atoms,
   (d) polyamides obtained from a mixture of:
      (i) 40–98 mole percent isophthalic acid, based on total acids present,
      (ii) 2–60 mole percent terephthalic acid based on total acids present,
      (iii) 50–98 mole percent hexamethylene diamine, based on total amines present; and
      (iv) 2–50 mole percent, based on total amines present, of at least one aliphatic diamine containing between 8 and 20 carbon atoms and containing at least one cyclohexane nucleus,
   wherein the mole percent acids present totals 100% and the mole percent amines present totals 100%.

4. The blend of claim 1 in which the amorphous polyamide is
   (i) 40–98 mole percent isophthalic acid, based on total acids present,
   (ii) 2–60 mole percent terephthalic acid based on total acid present, (iii) 50-98 mole percent hexamethylene diamine, based on total amines present; and (iv) 2-50 mole percent, based on total amines present, of at least one aliphatic diamine containing between 8 and 20 carbon atoms and containing at least one cyclohexane nucleus.

5. The blend of claims 1, 2, 3 or 4 wherein the toughening agent is a polymer of ethylene, at least one α-olefin of 3 to 6 carbon atoms, and at least one unsaturated monomer taken from the class consisting of branched, straight chain and cyclic compounds having from 4 to 14 carbon atoms and having at least one additional non-conjugated unsaturated carbon-carbon bond, in which said polymer has grafted thereto an unsaturated monomer taken from the class consisting of (a) α,β-ethylenically unsaturated dicarboxylic acids having from 3 to 8 carbon atoms, and derivatives thereof taken from the class consisting of monoesters of alcohols of 1 to 29 carbon atoms, (b) analysis of the dicarboxylic acids, (c) the metal salts of the dicarboxylic acids and the monoesters of said dicarboxylic acid having from 0 to 100 percent of the carboxylic groups ionized by neutralization with metal ions.

6. The blend of claims 1, 2, 3 or 4 wherein the toughening agent is a copolymer of ethylene, methyl or ethyl acrylate, and from about 0.0025-0.077 mole/100 g polymer of a mono alkyl ester of 1,4-butenedioic acid in which the alkyl group of the ester has 1 to 6 carbon atoms and having 0 to 100 percent of the esters of 1,4-butenedioic acid ionized by neutralization with metal ions selected from lithium, sodium, potassium, calcium and zinc ions.

7. The blend of claims 1, 2, 3 or 4 wherein the toughening agent is a polymer of ethylene and unsaturated monomers taken from the class consisting of (a) α,β-ethylenically unsaturated carboxylic acids (preferably) having from 3 to 8 carbon atoms, and derivatives of the acid taken from the class consisting of (a) monoesters of alcohols of 1 to 29 carbon atoms (b) dicarboxylic acids and anhydrides of the dicarboxylic acids and (c) metal salts of the monocarboxylic, dicarboxylic acids and monoesters of the dicarboxylic acid having from 0 to 100 percent of the carboxylic acid groups ionized by neutralization with metal ions.

8. The blend of claims 1, 2, 3, or 4 wherein the toughening agent is an organic polymer which comprises a first phase polymerized from monomers comprising 50 to 99.9 parts by weight alkyl acrylate wherein the alkyl group contains one to 15 carbon atoms, butadiene or substituted butadiene; 0 to 40 parts by weight of other ethylenically unsaturated monomers; 0 to 5 parts by weight of a polyethylenically unsaturated crosslinking monomer; and 0 to 5 parts by weight of a graft-linking monomer; and a final rigid phase thermoplastic stage containing amine-reactive carboxylic acid groups and polymerized from monomers comprising 1 to 50 parts by weight of a copolymerizable carboxylic acid, 50 to 99 parts by weight of a member selected from the group consisting of alkyl methacrylates, styrenes, acrylonitrile, methacrylonitrile and olefins that when homopolymerized, form polymers having a heat distortion temperature greater than about 20° C.; 0 to 49 parts by weight of another acrylic monomer; and 0 to 40 parts of another copolymerizable ethylenically unsaturated monomer.

9. The blend of claims 1, 2, 3, or 4, in which the semicrystalline polyamide is 66 polyamide.

10. Process for preparing the blend of claim 1 which comprises mixing all the components.

11. Process for preparing a molded article from the blend of claim 1 which comprises extruding the blend into a mold.

12. Process for preparing an extruded article from the blend of claim 1 which comprises extruding a long shape, film, rod, or tube and cooling until the shaped form is solidified.

* * * * *